(12) United States Patent
Tsuneyoshi et al.

(10) Patent No.: US 6,178,454 B1
(45) Date of Patent: Jan. 23, 2001

(54) DATA COMMUNICATION METHOD AND SYSTEM THEREFOR

(75) Inventors: Taiji Tsuneyoshi; Toshinao Takeuchi, both of Tokyo (JP)

(73) Assignee: Oki Electric Industry, Co., Tokyo (JP)

( * ) Notice: Under 35 U.S.C. 154(b), the term of this patent shall be extended for 0 days.

(21) Appl. No.: 09/107,125

(22) Filed: Jun. 30, 1998

(30) Foreign Application Priority Data

Jul. 3, 1997 (JP) .................................................. 9-193243

(51) Int. Cl.[7] ....................................................... G06F 15/16
(52) U.S. Cl. ........................... 709/227; 709/217; 709/229
(58) Field of Search .................................... 709/203, 217, 709/227, 226, 225, 229, 219, 224; 714/4

(56) References Cited

U.S. PATENT DOCUMENTS

| 5,727,163 | * | 3/1998 | Bezos .................................... 235/380 |
| 5,826,245 | * | 10/1998 | Sandberg-Diment .................. 705/44 |
| 5,857,014 | * | 1/1999 | Summer et al. .................. 379/93.02 |
| 5,862,339 | * | 1/1999 | Bonnaure et al. .................... 709/227 |

* cited by examiner

*Primary Examiner*—Mehmet B. Geckil
(74) *Attorney, Agent, or Firm*—Rabin & Champagne, P.C

(57) ABSTRACT

In data communication, data not requiring secrecy are transmitted and received via an open communication network whose security is low, while data requiring secrecy are transmitted and received via a closed communication network whose security is higher than that of the open communication network.

2 Claims, 7 Drawing Sheets

```
ARTICLE ORDER NUMBER : abc-12345
ARTICLE NAME : TIPS FOR GARDENING
PURCHASER NAME : TUNEYOSHI
PURCHASER ADDRESS : JAPAN
ARTICLE PRICE : ¥2,000-
NUMBER OF ARTICLES TO BUY : 3
TOTAL : ¥6,000-
CREDIT COMPANY NAME : DEFG CREDIT
CREDIT CARD NUMBER : 9876543
CREDIT CARD AVAILABLE TERM : 12/31/1999
TELEPHONE NUMBER FOR CONNECTION : 03-1234-123
DESTINATION ADDRESS : defg@defg.com
```
~15

DATA COMMUNICATION METHOD AND SYSTEM THEREFOR

BACKGROUND OF THE INVENTION

1. Field of the Invention

The present invention relates to a data communication method of transmitting and receiving data requiring secrecy and data requiring no secrecy, and further relates to a data communication system carrying out such a data communication method.

2. Description of the Related Art

Business transactions are now carried out on open communication networks, such as the Internet, which allow anyone to access it. For such business transactions, data is mainly required, such as data on goods and/or services (hereinafter referred to as "article data" for brevity) to be transmitted by sales companies offering goods and/or services (hereinafter referred to as "articles" for brevity), as well as data transmitted from purchasers buying those articles. Among those data, the article data includes, for example, names, characteristics, functions, prices and so forth of the articles and thus do not require secrecy, or rather, would be preferably delivered to as many people as possible. Therefore, the article data are broadcast to many people from sales companies on the open communication network. On the other hand, the purchaser data includes for example, identities of purchasers, credit card numbers and so forth and thus require secrecy. Thus, the purchaser data are confidentially transmitted to the sales companies from the purchasers concerned on the open communication network. As a typical technique for realizing the confidential communication, encryption of data has been carried out.

On the open communication network, however, even the enciphered data may be subjected to a possibility of surreptitious use by third parties who attempt decryption thereof. Therefore, in the business transactions on the open communication network, it has been difficult to fully avoid leakage to the third parties of the purchaser data which require secrecy.

SUMMARY OF THE INVENTION

Therefore, it is an object of the present invention to provide an improved a data communication method.

It is another object of the present invention to provide an improved data communication system.

It is another object of the present invention to provide an improved data communication child device connectable to a data communication parent device.

According to one aspect of the present invention, there is provided a data communication method comprising a first step of transmitting and receiving first data via a first communication network; and a second step of transmitting and receiving second data whose secrecy is higher than that of the first data, via a second communication network whose security is higher than that of the first communication network, the second data relating to the first data.

The first step include a step of transmitting and receiving third data via the first communication network, the third data being necessary for carrying out the second step.

The first step may include a step of notifying from a first data communication device to a second data communication device via the first communication network that the first data communication device transmits the second data to the second data communication device via the second communication network, and that the second step includes a step of connecting the first data communication device to the second communication network; a step of connecting the second data communication device to the second communication network; and a step of transmitting the second data from the first data communication device to the second data communication device via the second communication network.

The first step may include a step of requesting from a first data communication device to a second data communication device via the first communication network that the second data communication device transmit the second data to the first data communication device via the second communication network, and that the second step includes a step of connecting the first data communication device to the second communication network; a step of connecting the second data communication device to the second communication network; and a step of transmitting the second data from the second data communication device to the first data communication device via the second communication network.

According to another aspect of the present invention, there is provided a data communication system comprising a first data communication device and a second data communication device which are connectable with each other via either one of a first communication network and a second communication network whose security is higher than that of the first communication network, the first data communication device transmitting first data and the second data communication device transmitting second data relating to the first data and requiring secrecy, wherein the second data communication device comprises a first connection circuit for connection to the first communication network; a reception circuit for receiving the first data from the first data communication device via the first communication network; a second connection circuit for connection to the second communication network; and a transmission circuit for transmitting the second data to the first data communication device via the second communication network.

The first data include third data may which are necessary for the second connection circuit to establish the connection to the second communication network, and the second connection circuit establishes the connection to the second communication network according to the third data.

The data may communication system further comprise a connection switching device for switching the connection of the second data communication device between the first communication network and the second communication network, wherein the second data communication device further comprises a control circuit for producing a switching command to cause the connection switching device to carry out the switching, and the connection switching device carries out the switching according to the switching command.

According to another aspect of the present invention, there is provided a data communication child device which is connectable to a data communication parent device via either one of a first communication network and a second communication network whose security is higher than that of the first communication network, the data communication parent device transmitting first data and receiving second data whose secrecy is higher than that of the first data, the data communication child device comprising a first connection circuit for connection to the first communication network; a reception circuit for receiving the first data from the data communication parent device via the first communication network; a second connection circuit for connection to the second communication network; and a transmission circuit for transmitting the second data to the data communication parent device via the second communication network.

The second connection circuit may carry out the connection to the second communication network after the first connection circuit carries out disconnection from the first communication network.

The first data include third data may which are necessary for the second connection circuit to establish the connection to the second communication network, and the second connection circuit establishes the connection to the second communication network according to the third data.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

Figure 1:
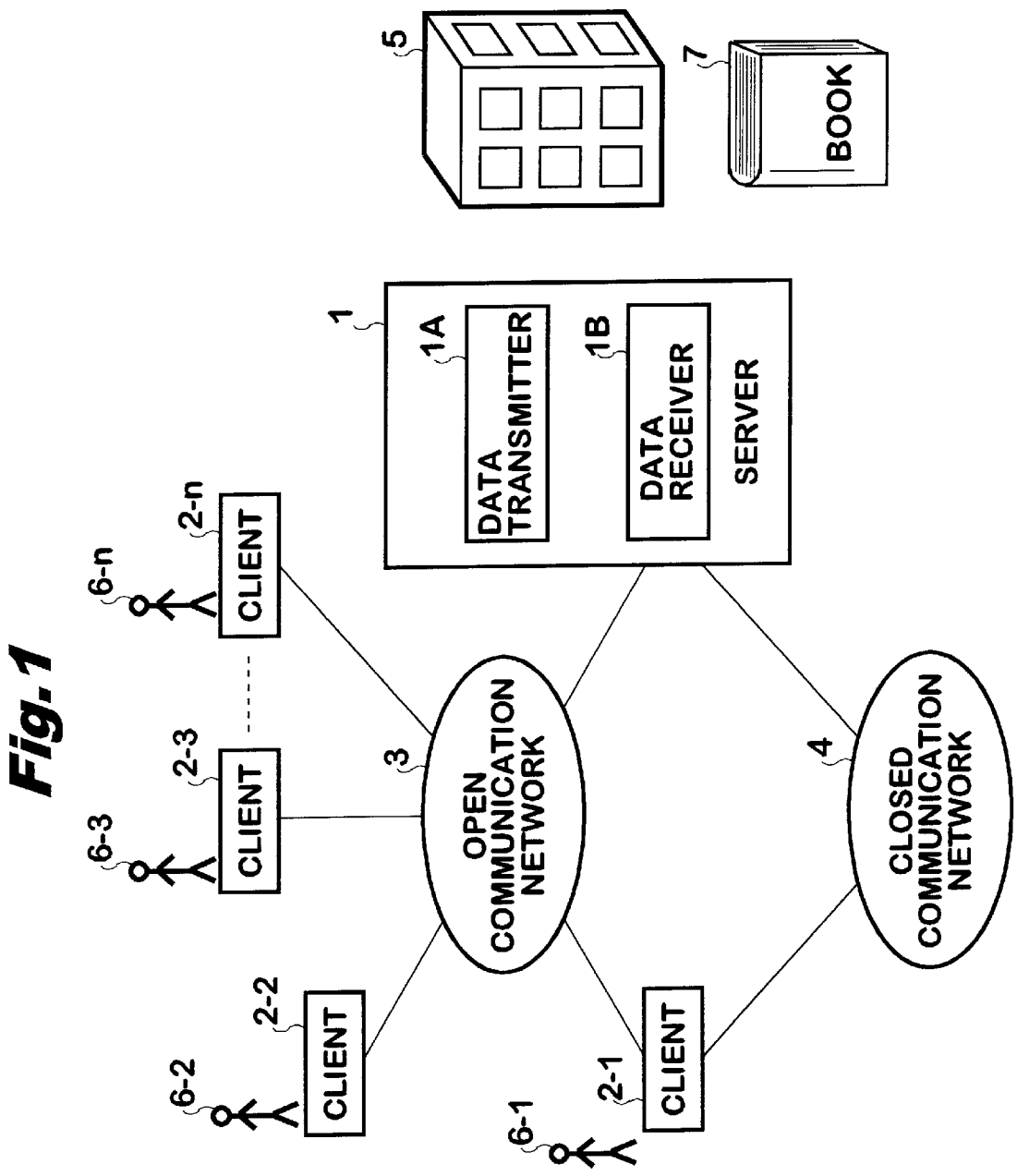
FIG. 1 is an explanatory diagram showing a structure of a data communication system according to a first preferred embodiment of the present invention.

FIG. 1 shows a structure of a data communication system according to the first preferred embodiment of the present invention. In FIG. 1, the data communication system comprises a data communication parent device 1 working as a so-called server (hereinafter referred to as "server" for brevity), and a plurality of data communication child devices 2-1 to 2-n (n represents a given integer equal to or greater than 2) working as so-called clients (hereinafter referred to as "clients" for brevity). The server 1 is installed in a sales company 5 which offers articles (goods and/or services), while the clients 2-1 to 2-n are installed at homes of purchasers 6-1 to 6-n who buy the articles from the server 1 if they wish to.

Specifically, the server 1 transmits article data, including name, function, quality, price and so forth, of an article to be offered, to the clients 2-1 to 2-n. The purpose of transmitting the article data is for advertisement of the article. Therefore, the article data do not require secrecy.

The clients 2-1 to 2-n each transmit purchaser data, such as indication of whether to buy the article, and name, address, telephone number, credit card number and so forth of the purchaser, to the server 1. The purchaser data include private data of the purchaser, and thus require secrecy.

The server 1 and the clients 2-1 to 2-n carry out communications of the article data via an open communication network 3 whose security is low and the purchaser data via a closed communication network 4 whose security is higher than that of the open communication network 3. The open communication network 3 does not guarantee secrecy of data communicated therethrough. The internet is an example of the open communication network 3. On the other hand, the closed communication network 4 ensures secrecy of data communicated therethrough. Examples of the closed communication network 4 include a telephone line network, a facsimile line network, and a personal computer communication network.

The server 1 comprises a data transmitter 1A and a data receiver 1B. The data transmitter 1A transmits the article data to the clients 2-1 to 2-n via the open communication network 3. Specifically, the data transmitter 1A transmits the article data in the form of a homepage prepared using the HTML (Hyper Text Make-up Language), electronic mail or the like.

The data transmitter 1A adds, to the article data, connection switching data which are necessary for the clients 2-1 to 2-n to carry out switching from a connection to the open communication network 3 to connection to the closed communication network 4, such as a name of the closed communication network 4, a telephone number for dial-up connection, a destination address of the server 1 and an inquiry about whether to buy the article. By establishing connection to the closed communication network 4 using the foregoing connection switching data, the clients 2-1 to 2-n can transmit the purchaser data to the server 1 via the closed communication network 4, respectively.

The data receiver 1B directly receives the purchaser data from the clients 2-1 to 2-n via the closed communication network 4. Specifically, the server 1 and one of the clients 2-1 to 2-n are selectively connected to each other in turn so as to establish one-to-one connection therebetween. The clients establishing the one-to-one connection to the server 1 transmit the corresponding purchaser data to the server 1 in turn.

Figure 2:
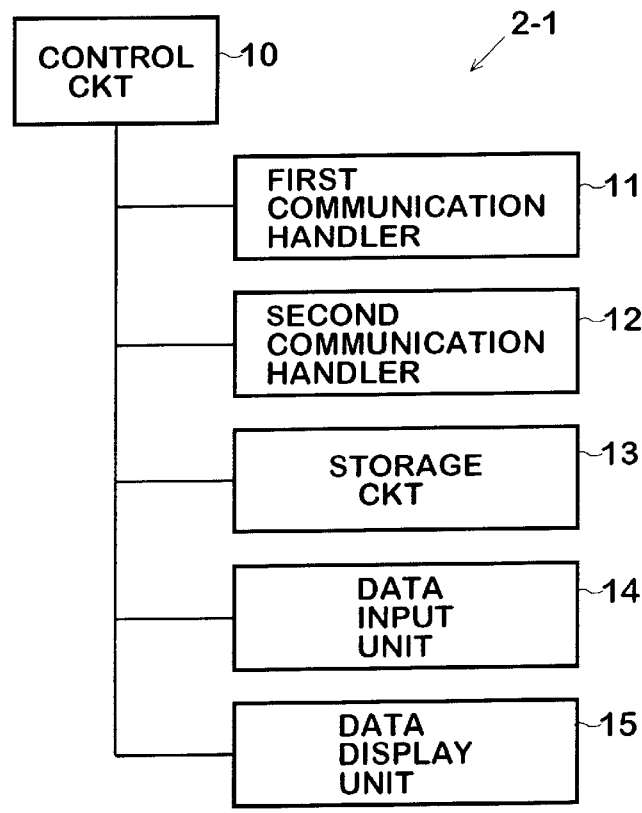
FIG. 2 is a block diagram showing a structure of a data communication child device incorporated in the data communication system shown in FIG. 1.

Since all the clients 2-1 to 2-n have the same structure, explanation will be given hereinbelow with respect to the client 2-1. As shown in FIG. 2, the client 2-1 comprises a control circuit 10, a first communication handler 11, a second communication handler 12, a storage circuit 13, a data input unit 14 and a data display unit 15.

The control circuit 10 controls the client 2-1. Specifically, the control circuit 10 manages the start and stop of operations of the first and second communication handers 11 and 12, data communicated through the first and second communication handers 11 and 12, data stored into the storage circuit 13, data input through the data input unit 14, data output to the data display unit 15, and so forth.

The first communication handler 11 performs connection to and disconnection from the open communication network 3, and receives the article data from the server 1 via the open communication network 3. As software for realizing the first communication handler 11, Internet Explorer (Microsoft Corporation), Netscape Communicator (Netscape Corporation), Eudora (Qualcomm Corporation) or the like, which follows a communication protocol of the open communication network 3, can be cited. The second communication handler 12 performs connection to and disconnection from the closed communication network 4, and transmits the purchaser data to the server 1 via the closed communication network 4. Examples of software for realizing the second communication hander 12 include Hyperterminal (Hilgraeve Corporation) or the like, which follows a communication protocol of the closed communication network 4. The first and second communication handlers 11 and 12 have a modem (not shown) as hardware thereof which carries out modulation and demodulation for communication through the open communication network 3 or the closed communication network 4. With this arrangement, the article data and the purchaser data can be communicated through the communication networks 3 and 4 according to the communication protocols of the communication networks 3 and 4, respectively.

The storage circuit 13 stores programs and various data for operating the control circuit 10 and the first and second communication handlers 11 and 12. The storage circuit 13 comprises, for example, a ROM (Read Only Memory) and a RAM (Random Access Memory).

The data input unit 14 is used for inputting the purchaser data, data necessary for carrying out the communication via the communication networks 3 and 4 and controlling the client 2-1, and so forth. The data input unit 14 comprises, for example, a keyboard, a mouse and a voice input device.

Figure 3:
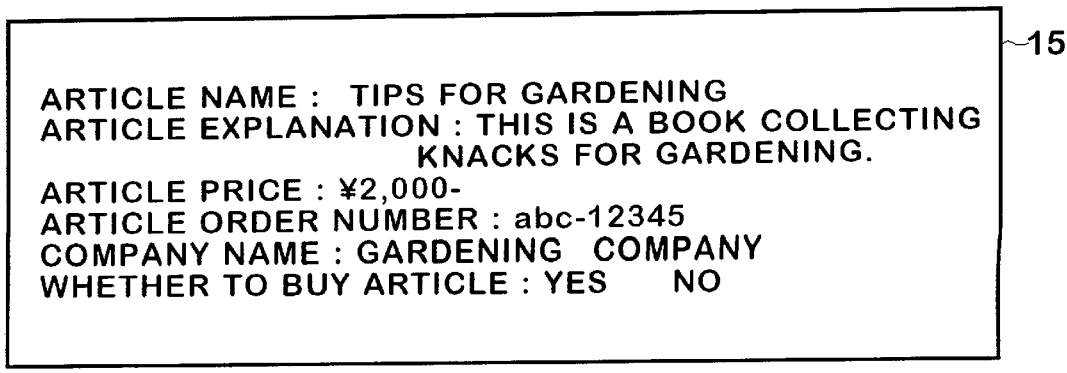
FIG. 3 is a diagram showing article data and connection switching data to be shown on a data display unit of the data communication child device shown in FIG. 2.
Figures 4, 5:
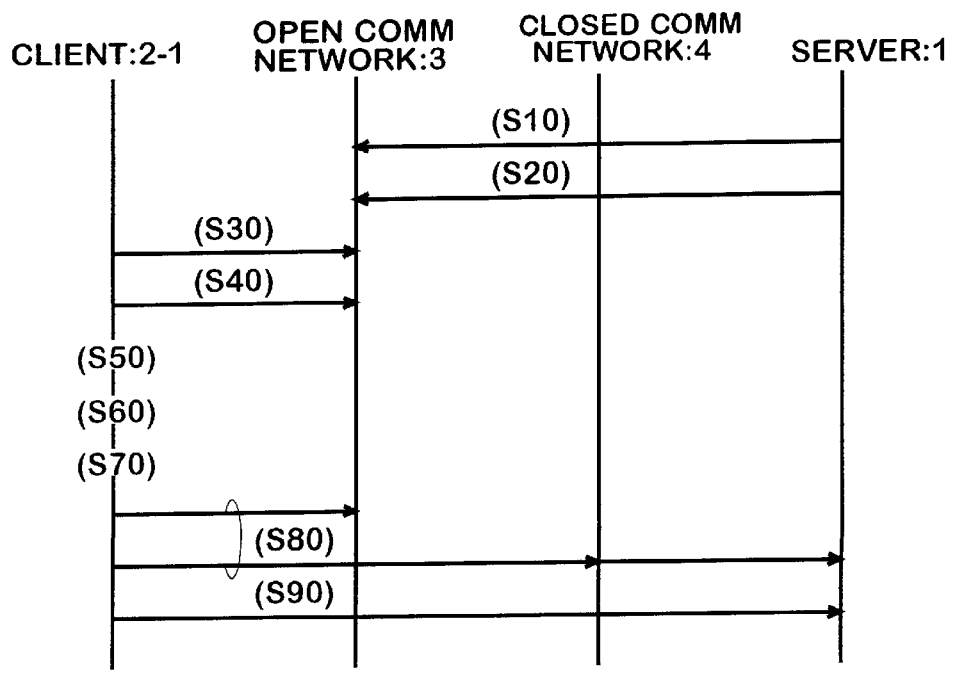
FIG. 4 is a diagram showing purchaser data and connection switching data to be shown on the data display unit.
FIG. 5 is a time chart showing an operation of the data communication system shown in FIG. 1.

The data display unit 15 comprises, for example, a CRT display and may include a printer. The data display unit 15 is used for displaying the article data received from the server 1 and the purchaser data inputted via the data input unit 14. Specifically, as shown in FIG. 3, the data display unit 15 displays as article data a name, an explanation, a price and an order number of an article and a name of a sales company, and further displays as connection switching data an inquiry about whether to buy the article. On the other hand, as shown in FIG. 4, the data display unit 15 displays as purchaser data, an order number, a name and a price of an article to buy, the number of articles, the total amount, a name of a sales company, a credit card number, a credit card available term and so forth, and further displays as connection switching data a telephone number for dial-up connection to the closed communication network 4, and a destination address of the server 1.

Now, an operation of the data communication system according to this embodiment will be described with reference to a time chart of FIG. 5. In the following description, it is assumed that the purchaser 6-1 having the client 2-1 buys an article 7 (a book in this embodiment).

Step S10: The server 1 in the sales company 5 establishes connection to the open communication network 3 using the data transmitter 1A.

Step S20: Subsequent to the establishment of connection to the open communication network 3, the data transmitter 1A opens the article data and the connection switching data to the open communication network 3. After this, all the clients 2-1 to 2-n can access to the opened article data and connection switching data if only connected to the open communication network 3.

Step S30: In response to a command input by the purchaser 6-1 via the data input unit 14, the client 2-1 establishes connection to the open communication network 3. Specifically, in response to the input command, the control circuit 10 controls the first communication handler 11 to establish connection to the open communication network 3.

Step S40: The first communication handler 11 receives the article data of the article 7 and the connection switching data via the open communication network 3.

Step S50: After receipt of the article data and the connection switching data, the control circuit 10 stores the article data in the storage circuit 14 and further controls the data display unit 15 to display the article data and the inquiry about whether to buy the article, i.e. one of the connection switching data, as shown in FIG. 3.

Step S60: The purchaser 6-1 determines whether to buy the article 7 based on the displayed article data. If having determined to buy the article 7, the purchaser 6-1, using the data input unit 14, selects YES as one of the connection switching data, and then inputs purchaser data, such as name and address of the purchaser 6-1, the number of articles to buy, the total amount, a name of a credit company, a credit card number and a credit card available term.

Step S70: In response to the input of the purchaser data, the control circuit 10 controls the data display unit 15 to display the purchaser data and a part of the connection switching data, i.e. a telephone number for connection to the closed communication network 4 and a destination address of the server 1.

Step S80: After the display on the data display unit 15, the control circuit 10 controls the first communication handler 11 to carry out disconnection from the open communication network 3, and further controls the second communication handler 12 to establish connection to the closed communication network 4 and further to the server 1 via the closed communication network 4 based on the connection switching data, i.e. the for-connection telephone number and the destination address.

Step S90: After establishing the connection to the server 1 via the closed communication network 4, the control circuit 10 controls the second communication handler 12 to transmit the purchaser data to the server 1.

As described above, according to the data communication system of the first preferred embodiment, the server 1 transmits to the clients 2-1 to 2-n the article data of the article 7 and the connection switching data necessary for switching from connection to the open communication network 3 to connection to the closed communication network 4 via the open communication network 3 which does not ensure secrecy of data. In response to receipt of the article data, the purchaser 6-1 wishing to buy the article uses the client 2-1 to input the purchaser data, such as the number of articles to buy, the name and address of the purchaser 6-1 and the credit card number. After the completion of inputting the purchaser data, the client 2-1 carries out disconnection from the open communication network 3 and then establishes connection to the closed communication network 4 according to the connection switching data. Via the closed communication network 4, the client 2-1 transmits the purchaser data to the server 1. In this fashion, although the article data of the article 7 are widely open to the purchasers 6-1 to 6-n via the open communication network 3, the purchaser data of the purchaser 6-1 wishing to buy the article 7, which relate to the article data and require secrecy, are transmitted and received without leakage to the third parties.

Now, a data communication system according to the second preferred embodiment of the present invention will be described. The data communication system of the second preferred embodiment differs from that of the first preferred embodiment only in structures and operations of a newly added connection switching device 20 (see FIG. 6) and a connection switching control circuit 30 (see FIG. 7) replacing the first and second communication handlers 11 and 12. The same reference signs represent the same or like components in FIGS. 1 and 2 (first preferred embodiment) and FIGS. 6 and 7 (second preferred embodiment).

Figure 6:
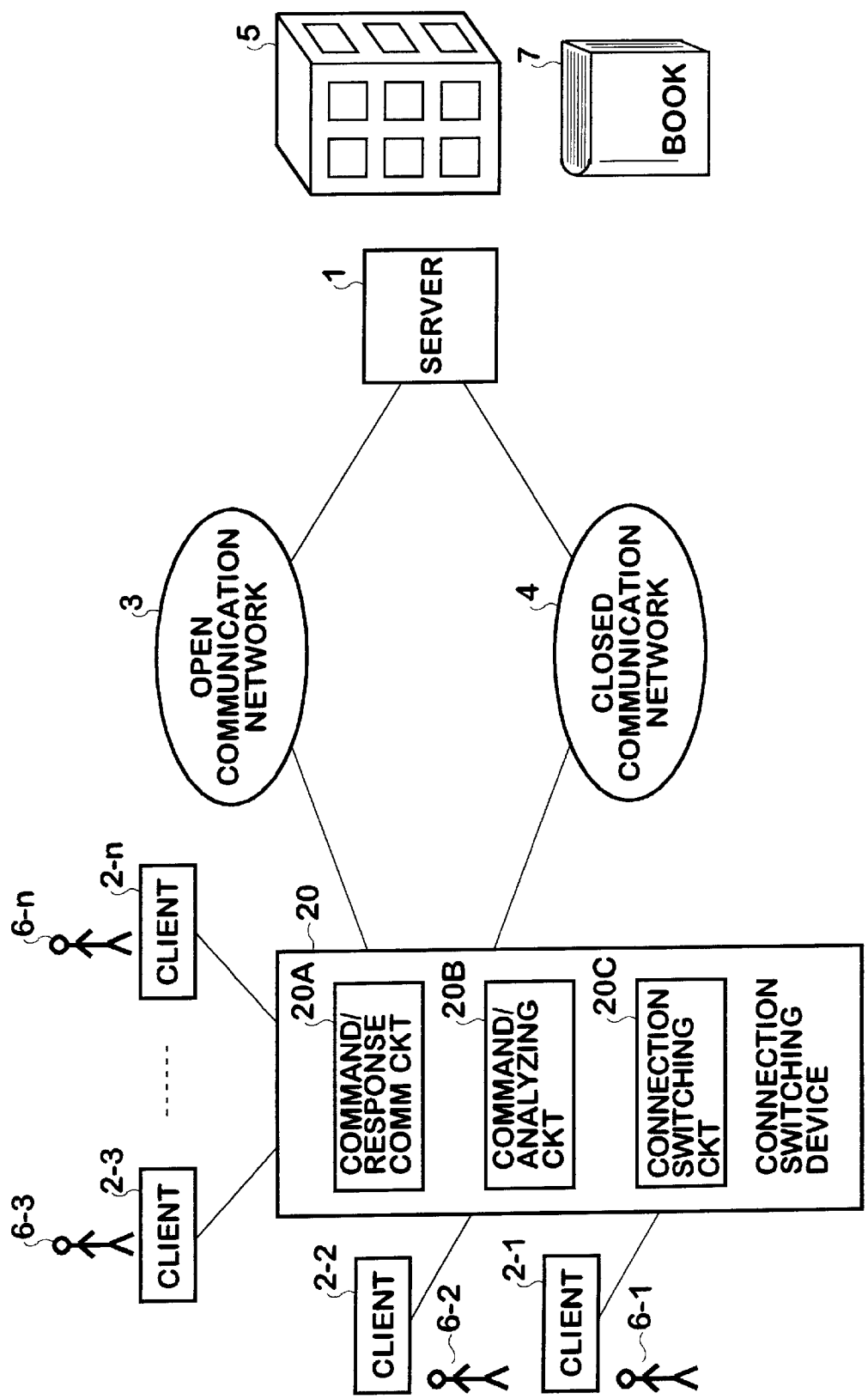
FIG. 6 is an explanatory diagram showing a structure of a data communication system according to a second preferred embodiment of the present invention.
Figure 7:
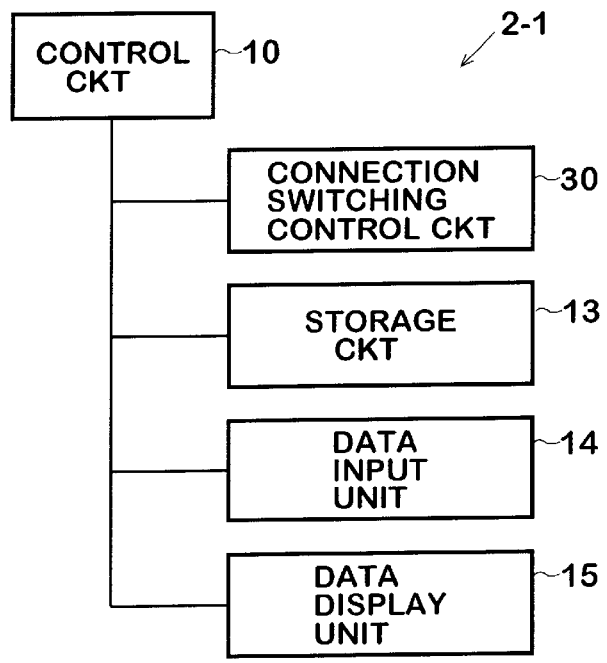
FIG. 7 is a block diagram showing a structure of a data communication child device incorporated in the data communication system shown in FIG. 6.

As shown in FIG. 6, the data communication system includes data communication child devices (hereinafter referred to as "clients" for brevity) 2-1 to 2-n. Since all the clients 2-1 to 2-n have the same structure, FIG. 7 shows a structure of only the client 2-1. As shown in FIG. 7, the client 2-1 has the connection switching control circuit 30. The connection switching control circuit 30 transmits to the connection switching device 20 a command which is necessary for connection to the open communication network 3 or the closed communication network 4. The command may be produced automatically by a control circuit 10 or manually by the purchaser 6-1.

As shown in FIG. 6, the data communication system includes the connection switching device 20. The connection switching device 20 is provided between the clients 2-1 to 2-n and the communication networks 3 and 4. The connection switching device 20 switches connections of the clients 2-1 to 2-n between the open communication network 3 and the closed communication network 4, respectively. For carrying out such switching, the connection switching device 20 comprises a command/response communication circuit 20A, a command analyzing circuit 20B and a connection switching circuit 20C.

The command/response communication circuit 20A receives connection switching commands from the connection switching control circuits 30 of the clients 2-1 to 2-n, respectively, and transmits responses notifying the completion of connection switching to the connection switching control circuits 30, respectively. The command analyzing circuit 20B analyzes the commands received at the command/response communication circuit 20A. Then, based on the results of the analysis, the connection switching circuit 20C connects the clients 2-1 to 2-n to the open communication network 3 or the closed communication network 4, respectively.

Figure 8:
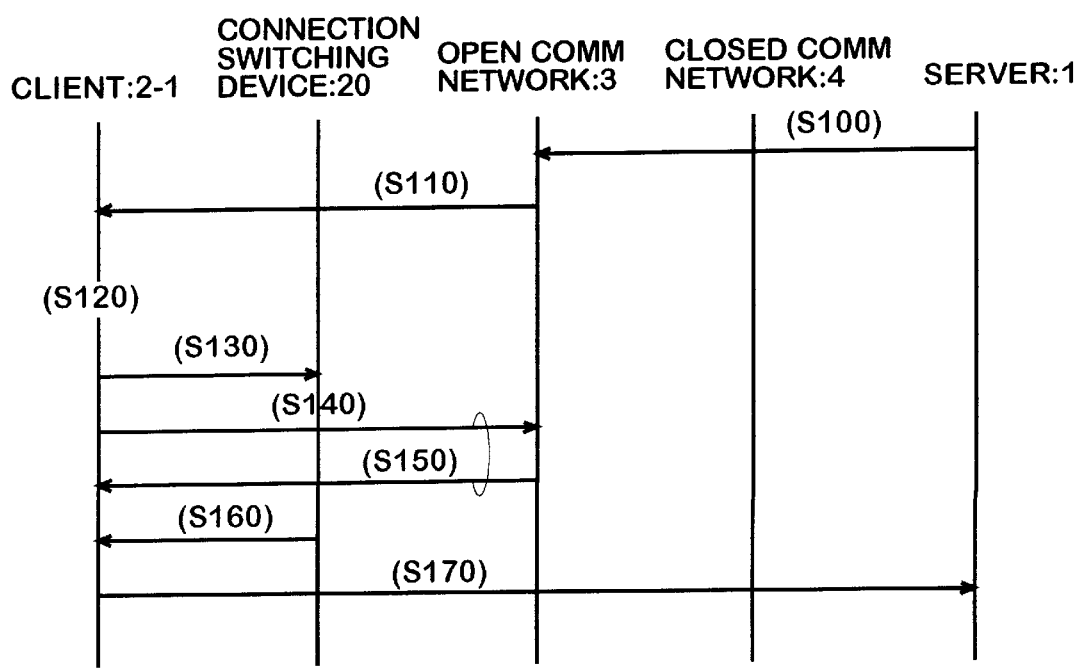
FIG. 8 is a time chart showing an operation of the data communication system shown in FIG. 6.

Now, an operation of the data communication system according to this embodiment will be described with reference to a time chart of FIG. 8. In the following description, it is assumed that the server 1 and the client 2-1 are connected in advance via the open communication network 3.

Step S100: The server 1 opens the article data of the article 7 and the connection switching data to the open communication network 3.

Step S110: The client 2-1 receives the article data and the connection switching data via the open communication network 3.

Step S120: If having determined to buy the article 7, the purchaser 6-1 inputs the purchaser data using the data input unit 14.

Step S130: In response to the input of the purchaser data, the control circuit 10 feeds to the connection switching control circuit 30, based on the connection switching data, a command necessary for switching from connection to the open communication network 3 to connection to the closed communication network 4. Then, the connection switching control circuit 30 transmits this command to the connection switching device 20.

Step S140: When the command/response communication circuit 20A in the connection switching device 20 receives the command from the connection switching control circuit 30, the command analyzing circuit 20B analyzes the command.

Step S150: When it is confirmed that the command instructs switching from connection to the open communication network 3 to connection to the closed communication network 4, the connection switching circuit 20C carries out disconnection between the client 2-1 and the open communication network 3 and further carries out connection between the client 2-1 and the closed communication network 4.

Step S160: Upon establishment of connection to the closed communication network 4, the command/response communication circuit 20A notifies to the connection switching control circuit 30 a response representing the establishment of connection to the closed communication network 4.

Step S170: Upon receipt of the response, the connection switching control circuit 30 feeds the response to the control circuit 10. Subsequent to acknowledgment of the required connection based on the received response, the control circuit 10 controls the connection switching control circuit 30 to transmit the purchaser data to the server 1 via the closed communication network 4 according to the connection switching data.

As described above, according to the data communication system of the second preferred embodiment, like in the data communication system of the first preferred embodiment, the article data not requiring secrecy can be communicated via the open communication network 3, while the purchaser data relating to the article data and requiring secrecy can be communicated via the closed communication network 4 keeping secrecy thereof. Further, upon switching from connection to the open communication network 3 to connection to the closed communication network 4, the data communication system of the second preferred embodiment does not require either cancellation of an existent call for connection to the open communication network 3 or generation of a new call for connection to the closed communication network 4, which, however, are required in the data communication system of the first preferred embodiment. Therefore, assuming that communication costs, such as telephone charges, are proportional to the number of calls, the telephone charges to be paid by the purchaser 6-1 can be reduced.

Figure 9:
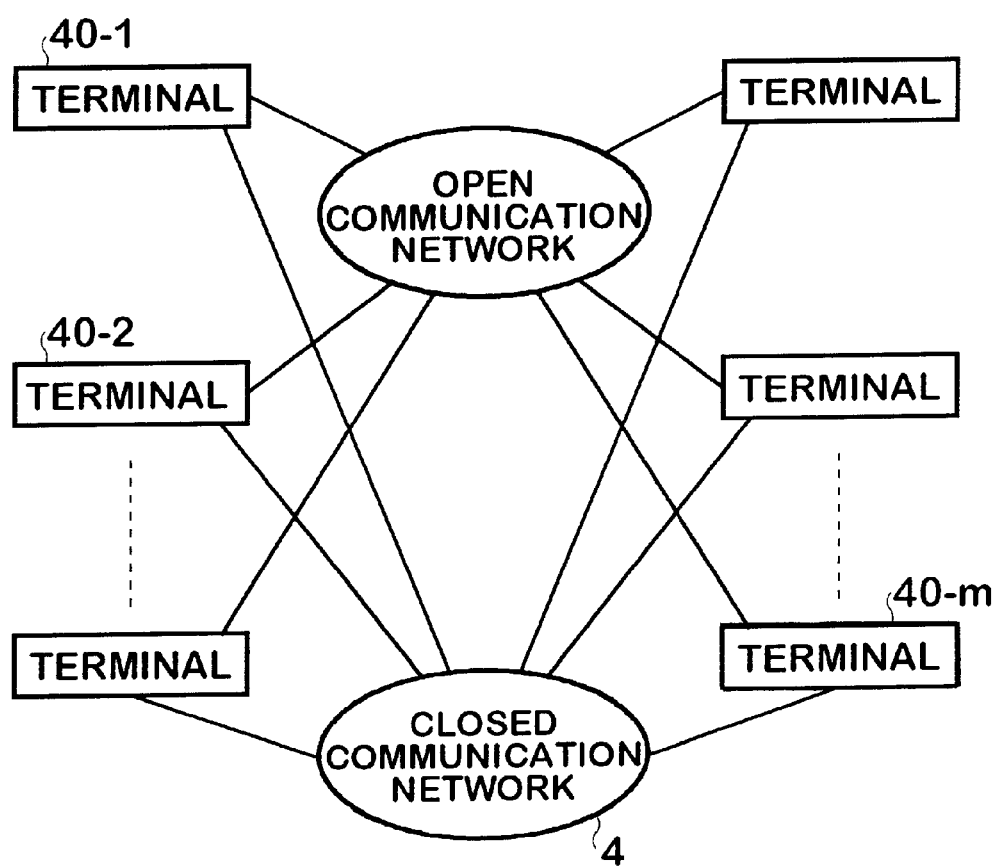
FIG. 9 is an explanatory diagram showing a structure of a data communication system according to a third preferred embodiment of the present invention.

Now, a data communication system according to the third preferred embodiment of the present invention will be described. As shown in FIG. 9, the data communication system of this embodiment comprises a plurality of terminals 40-1 to 40-m (m represents a given integer equal to or greater than 2) which are connectable with each other via the open communication network 3 or the closed communication network 4. Data transmitted and received between the terminals are classified into data not requiring secrecy and data requiring secrecy. The former data are communicated via the open communication network 3, while the latter data are communicated via the closed communication network 4. In this system, to ensure free communication of data between the terminals, the terminals are normally connected to the open communication network 3 except when transmitting and receiving data requiring secrecy.

Figure 10:
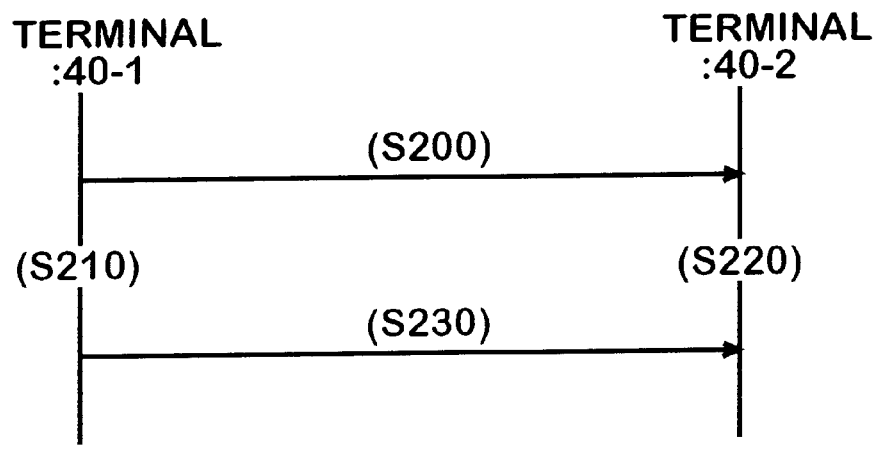
FIG. 10 is a time chart showing an operation of a terminal for data transmission in the data communication system shown in FIG. 9.

Now, an operation of the terminal 40-1 for transmitting data requiring secrecy to the terminal 40-2 will be described with reference to a time chart shown in FIG. 10.

Step S200: The terminal 40-1 requests the terminal 40-2 via the open communication network 3 to switch from connection to the open communication network 3 to connection to the closed communication network 4.

Step S210: After sending the request to the terminal 40-2, the terminal 40-1 performs disconnection from the open communication network 3 and, instead, establishes connection to the closed communication network 4.

Step S220: Like the terminal 40-1, the terminal 40-2 performs disconnection from the open communication network 3 and, instead, establishes connection to the closed communication network 4.

Step S230: After the establishment of connection between the terminals 40-1 and 40-2 via the closed communication network 4, the terminal 40-1 transmits data requiring secrecy to the terminal 40-2 via the closed communication network 4. In this fashion, the data requiring secrecy are delivered from the terminal 40-1 to the terminal 40-2 while secrecy thereof is kept.

Figure 11:
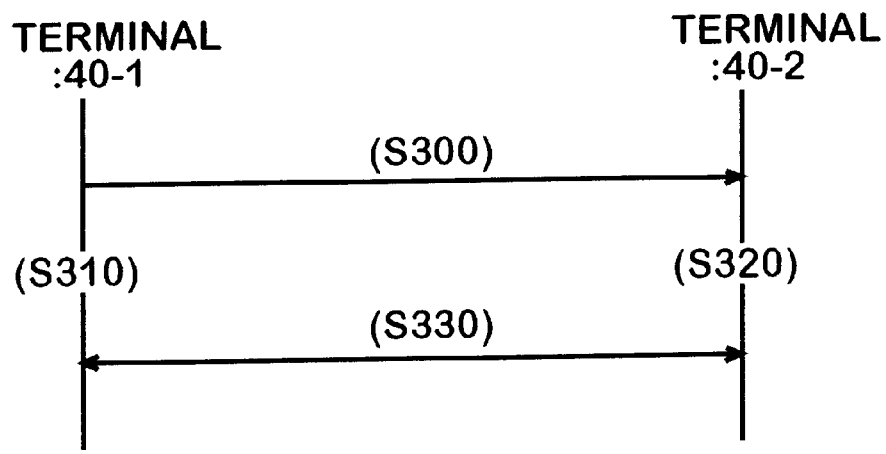
FIG. 11 is a time chart showing an operation of a terminal for data reception in the data communication system shown in FIG. 9.

Now, an operation of the terminal 40-1 for receiving data requiring secrecy from the terminal 40-2 will be described with reference to a time chart shown in FIG. 11.

Step S300: The terminal 40-1 requests the terminal 40-2 via the open communication network 3 to switch from connection to the open communication network 3 to connection to the closed communication network 4, and to transmit data requiring secrecy to the terminal 40-1 via the closed communication network 4.

Step S310: After sending the request to the terminal 40-2, the terminal 40-1 carries out disconnection from the open communication network 3 and, instead, establishes connection to the closed communication network 4.

Step S320: Like the terminal 40-1, the terminal 40-2 carries out disconnection from the open communication network 3 and, instead, establishes connection to the closed communication network 4.

Step S330: After the establishment of connection between the terminals 40-1 and 40-2 via the closed communication network 4, the terminal 40-2 transmits data requiring secrecy to the terminal 40-1 via the closed communication network 4. In this fashion, the data requiring secrecy are delivered from the terminal 40-2 to the terminal 40-1 while secrecy thereof is kept.

As described above, according to the data communication system of the third preferred embodiment, irrespective of whether the data requiring secrecy are transmitted from the calling terminal or the called terminal, the connection to the open communication network 3 is switched to the connection to the closed communication network 4 prior to transmission and reception of the data requiring secrecy. With this arrangement, like in the first and second preferred embodiments, transmission and reception of the data requiring secrecy can be carried out while ensuring secrecy of the data.

Further, assuming that a charge for using the open communication network 3 is cheap while a charge for using the closed communication network 4 is expensive, it may be arranged that the terminals of business friends are normally connected to the open communication network 3, such as Internet, so as to exchange data not requiring secrecy via the open communication network 3 and, only when data requiring secrecy need to be exchanged, the connection to the open communication network 3 is cut while the connection to the closed communication network 4 is established so as to exchange the data requiring secrecy via the closed communication network 4. In this fashion, by exchanging only those data requiring secrecy via the closed communication network 4, the communication cost can be reduced as compared with a case wherein both the data requiring secrecy and the data not requiring secrecy are exchanged via the closed communication network 4.

While the present invention has been described in terms of the preferred embodiments, the invention is not to be limited thereto, but can be embodied in various ways without departing from the principle of the invention as defined in the appended claims.

What is claimed is:

1. A data communication method, comprising:

transmitting and receiving first data via a first communication network; and transmitting and receiving second data whose secrecy is higher than that of said first data, via a second communication network whose security is higher than that of said first communication network, said second data relating to said first data, wherein said transmitting and receiving said first data includes a first data communication device notifying a second data communication device, via said first communication network, that said first data communication device transmits said second data to said second data communication device via said second communication network, and wherein said transmitting and receiving said second data includes:
- connecting said first data communication device to said second communication network,
- connecting said second data communication device to said second communication network, and
- transmitting said second data from said first data communication device to said second data communication device via said second communication network.

2. A data communication method, comprising:

transmitting and receiving first data via a first communication network; and transmitting and receiving second data whose secrecy is higher than that of said first data, via a second communication network whose security is higher than that of said first communication network, said second data relating to said first data, wherein said transmitting and receiving said first data includes a first data communication device requesting a second data communication device, via said first communication network, to switch from a connection to said first communication network to a connection to said second communication network, and wherein said transmitting and receiving said second data includes:
- disconnecting said first data communication device from a connection to said first communication network and connecting said first data communication device to said second communication network,
- disconnecting said second data communication device from a connection to said first communication network and connecting said second data communication device to said second communication network, and
- transmitting said second data from one of said first and second data communication devices to the other of said first and second data communication devices via said second communication network.

* * * * *